No. 827,406. PATENTED JULY 31, 1906.
J. AUSTIN.
EXCAVATING DEVICE.
APPLICATION FILED SEPT. 25, 1905.
2 SHEETS—SHEET 1.
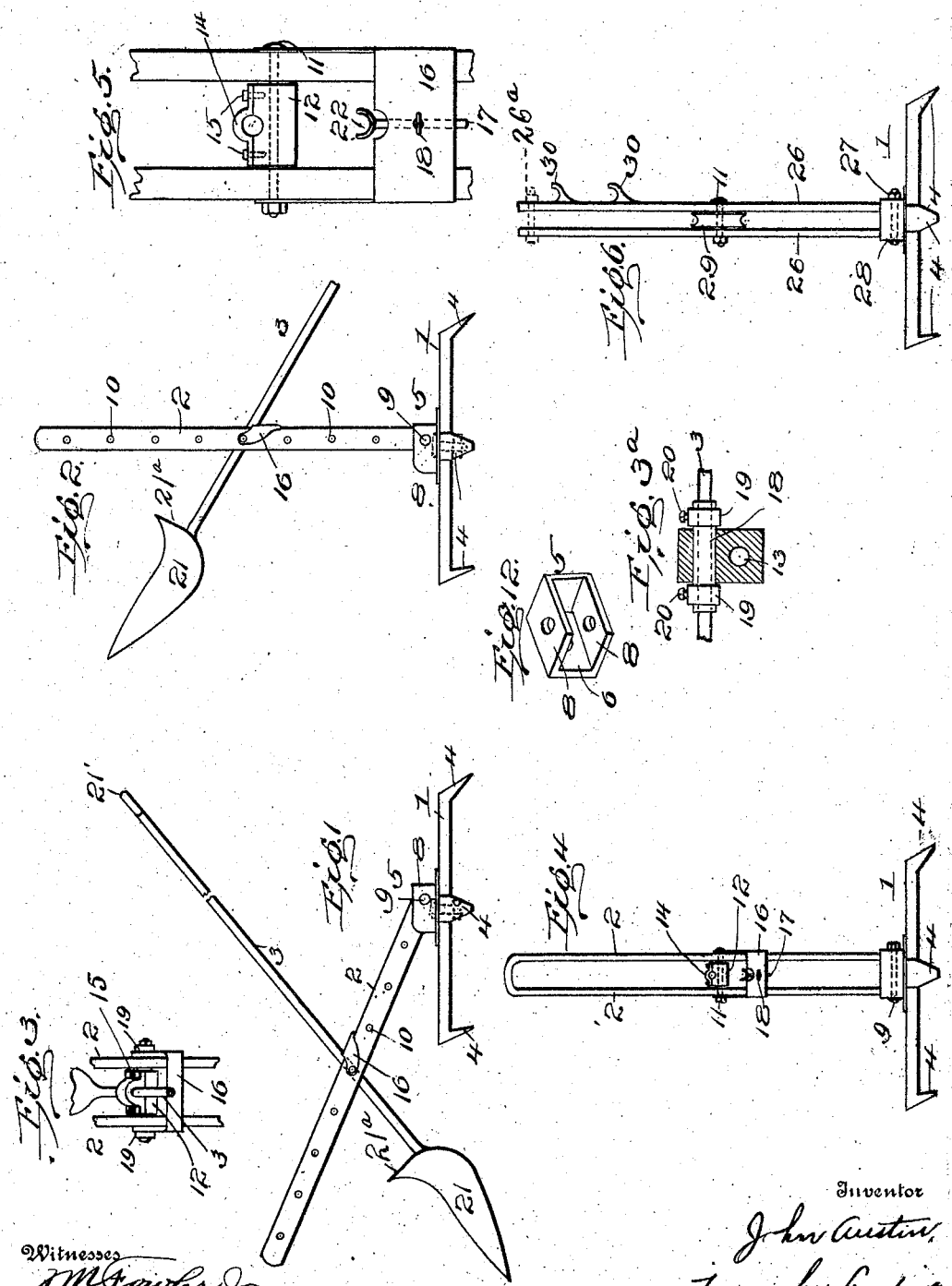
Witnesses
J. M. Fowler Jr.
E. E. Vrooman
Inventor
John Austin
By Mason, Fenwick & Lawrence
Attorneys

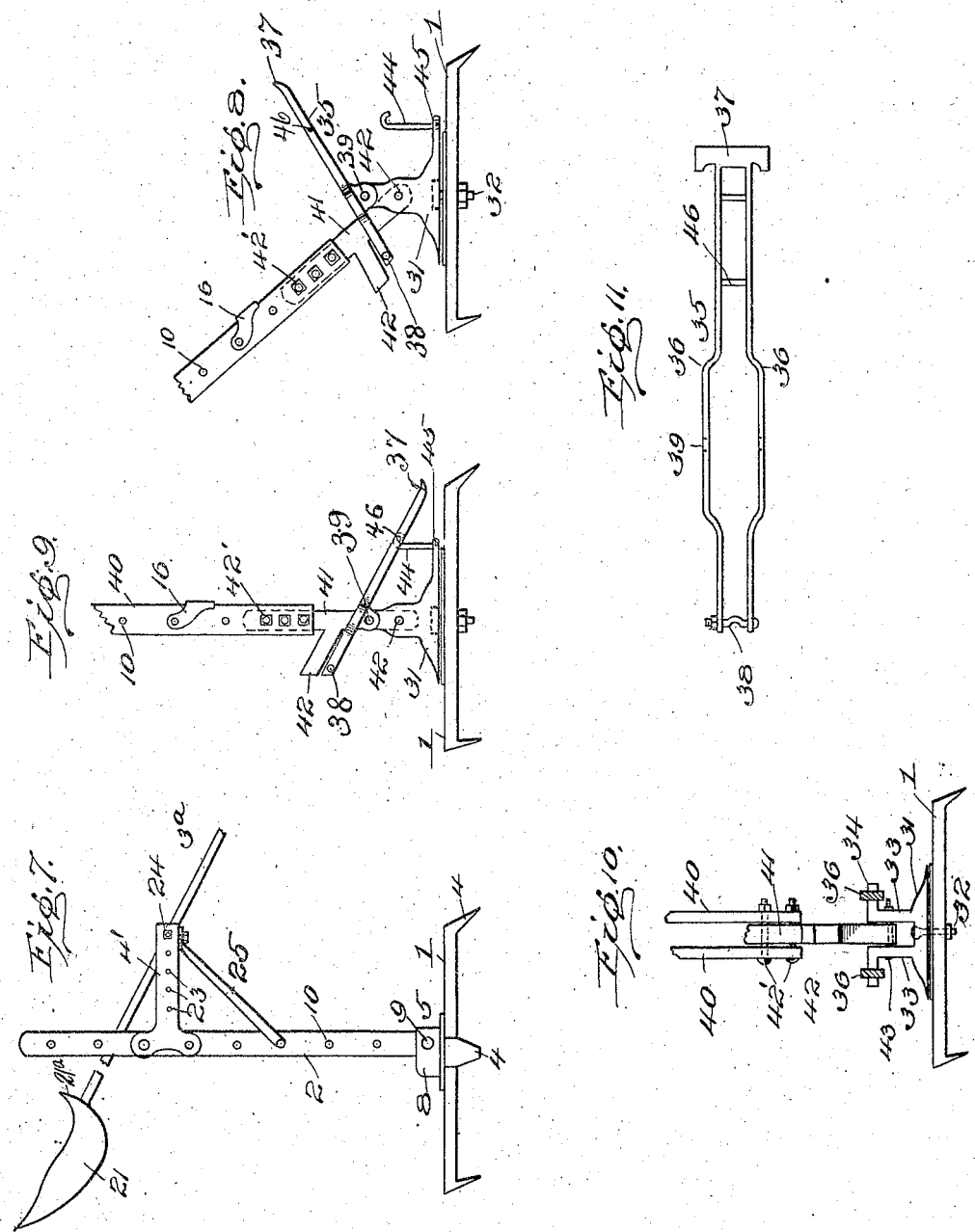

UNITED STATES PATENT OFFICE.

JOHN AUSTIN, OF FLORISSANT, COLORADO.

EXCAVATING DEVICE.

No. 827,406.  Specification of Letters Patent.  Patented July 31, 1906.

Application filed September 25, 1905. Serial No. 280,062.

*To all whom it may concern:*

Be it known that I, JOHN AUSTIN, a citizen of the United States, residing at Florissant, in the county of Teller and State of Colorado, have invented certain new and useful Improvements in Excavating Devices; and I do hereby declare the following to be a full, clear, and exact description of the invention, such as will enable others skilled in the art to which it appertains to make and use the same.

This invention relates to improvements in excavating devices, and particularly to an adjustable support for a shovel or scoop.

The object of the invention is the provision of means for facilitating the filling, lifting, and dumping of a receptacle—as, for instance, a scoop or shovel.

With this and other objects in view the invention consists of certain other novel constructions, combinations, and arrangements of parts, as will be hereinafter fully described, illustrated in the accompanying drawings, and more particularly pointed out in the claims hereto appended.

In the drawings, Figure 1 is a view in side elevation of my invention in position for filling the shovel or scoop, while Fig. 2 is a similar view, except the device is shown in a vertical position and the shovel in an elevated position. Fig. 3 is a fragmentary view of the device and shovel or scoop. Fig. 3ª is a sectional view of the supporting-block and a view in side elevation of the sleeve carried thereby. Fig. 4 is a rear view of the device with the shovel or scoop removed, showing an adjustable rest carried by the movable stop for the handle of the shovel. Fig. 5 is an enlarged fragmentary rear view of the parallel standards of the supporting device, showing the handle-engaging block and the movable stop. Fig. 6 is an elevated end view of another embodiment of the present invention. Fig. 7 is a view in side elevation of another embodiment of the present invention. Fig. 8 is a fragmentary view similar to Fig. 1 of another embodiment of the present invention, while Fig. 9 is a fragmentary view similar to Fig. 2 of the structure depicted in Fig. 8. Fig. 10 is a fragmentary front view of the embodiment depicted in Figs. 8 and 9. Fig. 11 is a top plan view of the foot-lever employed in constructing the device depicted in Figs. 8 and 9. Fig. 12 is a perspective view of the socket member used in the construction of the device depicted in Figs. 1 to 5 and 7.

Referring to the drawings, 1 designates an anchor carrying the vertical parallel standards 2 2, between which the handle 3 of the shovel or scoop is positioned. In the different embodiments of my invention the same principle is followed, although slight deviations in the specific structure of the standards and shovel-engaging means is made.

In excavating it is often found desirable to employ a shovel which is preferably manually operated for loading wheelbarrows or like receptacles, and for the purpose of facilitating the loading of the receptacle which is to be employed for conveying the excavated material I have produced a device by which the loading, lifting, and dumping of the shovel or scoop is facilitated, said device comprising, generically, the above-enumerated members.

The anchor 1 in several of the embodiments is of the same structure. The anchor 1 comprises, preferably, a plurality of members secured at an angle to each other, and upon the outer end of each of said members there is formed a prong or pointed downward extension 4. While the anchors 1 are similar in structure, in the embodiment depicted in Figs. 9 and 10 the anchor is formed with only one member, which is provided with two prongs or pointed extensions, one at each end. These prongs extend rearwardly, as is the case with the prongs of one of the members of the anchor in the other embodiments. The reason for extending these prongs 4 rearward is that the anchor, constituting the base of the device, can be easily moved forward for positioning the device near to the material which is to be excavated. This forward positioning of the device, and consequently the anchor, is obtained by the operator pushing, preferably by his foot, the anchor forward, thereby removing the prongs from the ground. When the device has reached its desired position, the operator by resting his foot against the anchor or base will securely retain said device in its adjusted position, as the prongs will penetrate the ground. Referring particularly to the embodiments depicted in Figs. 1 to 4 and 7, the socket members 5, supporting the parallel standards, are similar in structure. Each of the socket members 5 is mounted on an anchor 1 to swivel or swing with relation thereto. Each member comprises an apertured base 6, a back 7, and parallel apertured sides 8 8, Fig. 12.

The vertical parallel standards 2 2 are integrally connected at their upper ends and are not integrally connected at their lower ends. However, the lower ends of the standards 2 2 are connected through the medium of a bolt 9, upon which said standards are pivotally mounted. By means of the bolt 9 the standards 2, constituting a vertical frame, are capable of being moved in a vertical plane for permitting of the shovel or scoop to be filled. The socket member 5 is rotatably secured upon the anchor 1 by means of a bolt passing through the base 6 of said socket member and through the anchor, as, for instance, is shown in dotted lines, Fig. 1. The standards 2 are provided with parallel apertures 10. A bolt 11 is removably positioned within the apertures 10 for supporting the block 12. The block 12 is provided with an aperture 13, within which the bolt 11 is positioned. A removable plate 14 is secured, by means of threaded members 15 15, Fig. 5, upon the block 12. The block 12 constitutes a rest for the handle 3 of the shovel or scoop. A movable stop 16 is supported upon the bolt 11. The stop 16 comprises a body portion provided with integral parallel sides which are positioned upon the outside of the parallel standards 2 2 and are supported upon the bolt 11 outside of said standards. In Figs. 4 and 5 a vertically-adjustable handle-supporting member 17 is positioned upon the movable stop 16. The supporting member 17 is positioned within a vertical aperture formed in the body of the movable stop, said supporting member being fixedly secured in an adjusted position, preferably by means of a thumb-screw 18.

Referring to Fig. 3ª, a sleeve 18 is carried by block 12, within which is positioned the handle 3 of the shovel. Upon the sleeve 18 are adjusted collars 19 19, which may be secured in fixed positions by means of thumb-screws 20 20. The locking-collars 19 prevent the sleeve 18 from becoming displaced from upon the block 12. The collar 18 constitutes reinforcing means for the handle 3 at a point where the greatest strain is brought to bear thereon—that is to say, the handle 3 is fulcrumed upon the block and when a load in the shovel or scoop 21 is being lifted by the handle the strain is on that portion positioned within the sleeve 18. The handle-supporting member 17 is provided with a substantially U-shaped portion 22, formed upon its upper end, within which the handle may be positioned. The supporting member 17 may be adjusted vertically so as to engage the handle and act as a stop for limiting its pivotal movement without necessitating swinging said handle downward the entire distance between said block 12 and stop 16 necessary for causing the same to engage the stop 16, as is the case with the structure depicted in Figs. 1 and 2, in which the supporting member 17 is preferably omitted. By reason of the supporting member 17 downward pressure upon the handle 3 will tend to swing the standards constituting the frame to a vertical position, Fig. 2, before such movement is commenced when employing the stop and omitting the handle-supporting member. In the embodiment under consideration the pivotal frame is swung downward, Fig. 1, when the shovel is to be filled, and upon said shovel being filled the operator presses downward upon the handle, preferably grasping the grip 21', and upon the handle engaging the movable stop 16 the operator exerts not only the down pressure, but also a slight rearward pull, thereby lifting the loaded shovel, simultaneously swinging the pivoted frame to its normal vertical position. Said frame may be rotated to any desired position for permitting of the contents of the shovel to be dumped upon the desired side of the device. Therefore it will be obvious that the frame, as well as the shovel, is capable of vertical and rotary movement.

In the embodiment depicted in Fig. 7 I employ the parallel standards 2 2; but upon said standards I secure parallel horizontal brackets 4' 4'. The brackets 4' 4' are provided with parallel apertures 23, within which is positioned a bolt 24. The bolt 24 passes through the handle 3ª of the shovel 21. The handle 3ª is preferably squared at that portion through which bolt 24 passes, and therefore said handle is not capable of rotary movement at its fulcrum-point, as is the case with the handle 3, supported upon the device depicted in Fig. 1. The shovel in Fig. 7 can be emptied by a quick rotary movement and suddenly slightly lowering the same. The brackets 4' are provided with braces 25, which are secured, preferably, to the outer end of said bracket and to the outer sides of the standards 2. The inner ends of the brackets 4' are each provided with diametrically-projecting extensions, which normally engage the outer sides of the standards 2.

In the embodiment depicted in Fig. 6 there are parallel standards 26. The standards 26 are not integrally connected at their upper ends and at their lower ends are connected by means of a bolt 27, which is supported upon a socket member 28. The socket member is rotatably mounted by any suitable means upon the anchor 1. Of course it will be obvious that the standards 26 26, constituting the frame in this embodiment, may be secured upon socket member 5; but in the present instance said standards are not secured upon a socket member which is provided with an opened end, but upon a socket member which is closed at all of its sides and only open at its top, for the reason that I preferably desire the standards 26 26 not to be capable of pivotal movement, although they are removably secured upon socket member 28. However, the frame formed by means of the standards is capable of rotary movement. The standards 26 26 are preferably provided with parallel apertures, as is the case with the similar standards 2 2. Within one of the pair of apertures there is positioned bolt 11, which in this instance forms a journal upon which the sheave or grooved pulley 29 is journaled. The handle of the shovel or scoop is positioned between the parallel standards and rests upon the sheave or pulley when the device is in use. The sheave 29 acts as a fulcrum for the handle of the shovel or scoop. If it is desired to raise the handle to a higher elevation without adjusting the sheave 29 by positioning the bolt 11 in different apertures, this may be accomplished by removing the handle from between the parallel standards and placing it upon the brackets 30. These brackets are preferably removably secured to the side of the frame and are provided with an upper handle-receiving socket.

In the embodiment depicted in Figs. 8 to 11 a rotatable support 31 is removably positioned upon the anchor by means of an ordinary bolt-and-nut structure 32. The support 31 comprises a substantially disk-shaped base which is provided with vertical parallel extensions 33 33. Each of the extensions 33 is provided with a horizontal extension 34. The extensions 34 are formed for supporting a foot-lever 35. The foot-lever 35 comprises parallel sides 36 36, which are integrally connected at one end by a foot-engaging portion 37 and at their opposite end by a bolt 38, which is curved or bent intermediate its ends. Each of the sides 36 of the foot-lever 35 is formed with an aperture 39, within which is positioned one of the extensions 34. The parallel standards 40 are fixedly secured to an auxiliary standard 41 by means of a plurality of bolts or suitable fastening means 42'. The auxiliary standard 41 is provided with an upwardly-projecting extension 42, which is normally engaged by the bolt 38 of the foot-lever 35. The auxiliary standard 41 is pivotally mounted upon the parallel extension 33 of the support 31, preferably by means of bolt 43. It will therefore be obvious that the foot-lever and the auxiliary standard are independently mounted upon the parallel extensions 33 of the support 31. A pivoted latch 44 is mounted at 45 upon the support 31. The latch is adapted to engage the transverse pin 46, which is integral with the sides 36 of the foot-lever 35, Fig. 9, for securing said foot-lever in an adjusted position, and thereby prevent the vertical, movable frame from swinging downward. The extension 42 projects upward for facilitating the adjustment of the frame to a vertical position, for it is easier to lower the outer end of the foot-lever by permitting the bolt 38 to travel along the lower, upwardly-inclined surface of the extension 42 than would be the case if said extension projected in a horizontal plane from the auxiliary standard 41. The curved portion of the bolt 38 partially surrounds the extension 42. This bolt 38 will also serve as a stop for limiting the downward movement of the auxiliary standard 41, and consequently the parallel standards 40. A shovel supported upon the standards 40 40 is capable of vertical and rotary movement, for the support 31 can be easily rotated, as is the case with the socket 5. Between the standards 40 a sheave-wheel 29 may be secured by means of a bolt 11, positioned within the apertures 10. However, I preferably employ a block 12, Fig. 3ª, for supporting the handle of the shovel or scoop. It will therefore be obvious that in either event I employ handle-supporting means positioned between the standards. When the shovel or scoop is to be filled, the operator will move the vertical uprights forward to an inclined position, Figs. 1 and 8, until the shovel engages the material to be excavated and will then sink the shovel into said material. If the shovel is being forced too deep into the material or ground, he can check this movement by pressing down upon the lever 35. When the shovel is filled and ready to be raised, it will be necessary to press down upon the lever 35 and synchronously pull or press down upon the handle of the shovel and pull back upon the shovel. This moving of the shovel to an elevated position will necessarily be accomplished at the same time the standards constituting the frame are moved to a vertical position. The operator can then rotate the frame and shovel upon the base, and thereby position the shovel at any desired position for dumping the same upon either side of the device. The lever 35 is an important element of the device, for it will materially assist in controlling the "feed" or depth to which the shovel is sunk into the ground or material to be excavated. The lever also is of material assistance in positioning the frame in its normal upright position. The shovel 21 is provided with a substantially vertical back or rear end 21ª, which materially assists in retaining the material to be excavated within the same when the shovel is elevated, Figs. 2 and 7. The handle 3 or 3ª may be provided with an ordinary bent or curved portion intermediate its ends, assisting in the filling of the shovel.

In the embodiment depicted in Fig. 6 the upper end of the standards are preferably connected by any suitable fastening means—as, for instance, a bolt 26ª. By removing the bolt 26ª a shovel positioned between the standards 26 may be removed and placed upon one of the brackets 30.

What I claim is—

1. A device of the character described, comprising an anchor, constituting a base, said anchor comprising a horizontal member provided at each end with a prong, and shovel or scoop supporting means carried by said anchor.

2. A device of the character described, comprising an anchor, said anchor comprising a horizontal member provided at each end with a depending prong, and rotatable shovel-supporting means carried by said anchor.

3. A device of the character described, comprising an anchor, and rotatable and vertically-movable shovel-supporting means carried by said anchor.

4. A device of the character described, comprising an anchor provided with depending prongs, and vertically-movable shovel-supporting means carried by said anchor.

5. A device of the character described, comprising an anchor provided with downwardly and rearwardly extending prongs, and shovel-supporting means carried by said anchor.

6. A device of the character described, comprising an anchor provided with depending prongs, vertically-movable standards, constituting a frame carried by said anchor, and shovel-engaging means carried by said standards.

7. A device of the character described, comprising an anchor, rotatable and vertically-movable standards carried by said anchor, and shovel-engaging means carried by said standards.

8. A device of the character described, comprising an anchor, constituting a base, a rotatable member, constituting standard-supporting means, carried by said base, and standards supported upon said rotatable member.

9. A device of the character described, comprising a anchor provided with depending prongs, a rotatable member, constituting a socket, carried by said anchor, and standards pivotally mounted upon said rotatable member.

10. A device of the character described, comprising an anchor, a removable, rotatable member carried by said anchor, and a shovel or scoop supporting frame pivotally mounted upon said rotatable member.

11. A device of the character described, comprising an anchor, a rotatable member carried by said anchor, and removable, parallel standards carried by said rotatable member.

12. A device of the character described, comprising an anchor, a removable, rotatable member carried by said anchor, and integral, parallel, vertical standards pivotally mounted upon said rotatable member.

13. A device of the character described, comprising an anchor, and integral, parallel, apertured standards, constituting a frame, carried by said anchor.

14. A device of the character described, comprising an anchor, and parallel, apertured standards carried by said anchor and said standards being capable of rotary movement.

15. A device of the character described, comprising a horizontal member provided with depending, rearwardly-extending prongs, and an apertured frame carried by said anchor and capable of rotary and vertical movement.

16. A device of the character described, comprising a pronged base, apertured standards carried by said base, and shovel-engaging means carried by said standards.

17. A device of the character described, comprising an anchor, constituting a base, said anchor comprising a horizontal member provided with integral, downward and rearward depending prongs, a rotatable member, constituting a socket, carried by said anchor, parallel, apertured standards integrally connected at their upper end, removably positioned upon said rotatable member, transverse fastening means connecting the lower ends of said standard and the rotatable member, a block positioned between said standards, and a stop carried by said standards.

18. A device of the character described, comprising an anchor, constituting a base, standards carried by said anchor, and a removable stop carried by said standards.

19. A device of the character described, comprising a base, a vertically-movable and rotatable frame carried by said base, and a removable stop carried by said frame.

20. A device of the character described, comprising an anchor provided with depending prongs, parallel standards carried by said anchor, and a stop carried by said standards, said stop comprising a body portion provided with parallel sides.

21. A device of the character described, comprising an anchor, constituting a base, vertically-movable standards carried by said anchor, and a removable stop positioned upon the outer sides of said standards, said stop comprising a body portion provided with parallel sides.

22. A device of the character described, comprising a base provided with depending prongs, a vertically and rotatably movabl frame carried by said base, shovel-engaging means capable of rotary movement, carried by said frame, and a stop formed upon said frame and being capable of limiting movement of a shovel carried by said shovel-engaging means.

23. A device of the character described, comprising a support, parallel, apertured standards carried by said support, transverse supporting means carried by said standards, a shovel-supporting member carried by said transverse supporting means, and a movable stop carried by said transverse supporting means.

24. In a device of the character described, the combination with a support, of a vertically-movable frame carried by said support, and lever means for limiting movement of said frame.

25. In a device of the character described, the combination with a support, of a vertically and rotatably movable frame carried by said support, shovel-supporting means carried by said frame, and lever means carried by said support and engaging said frame and being capable of vertically and rotatably moving said frame.

26. In a device of the character described, the combination of an anchor, comprising a base, said anchor provided with a depending prong, a rotatable support carried by said anchor, parallel standards carried by said rotatable support, said standards being capable of vertical movement, shovel-supporting means carried by said standards, a lever fulcrumed upon said rotatable support and in engagement with said standards, and locking means for retaining said lever in an adjusted position.

27. In a device of the character described, the combination with a base, of a rotatable, bifurcated support carried by said base, primary standards, an auxiliary standard pivotally connecting said primary standards and rotatable support, shovel-supporting means carried by said standards, and lever means carried by said rotatable support, engaging said auxiliary standard and being capable of adjusting, and securing said standards in an adjusted position.

28. In a device of the character described, the combination of a base provided with a depending, rearwardly-extending prong, a rotatable, bifurcated support removably secured to said base, an auxiliary standard provided with a lateral extension, pivotally mounted within the bifurcated portion of said rotatable support, parallel standards carried by said auxiliary standard, shovel-supporting means carried by said parallel standards, a lever fulcrumed upon said rotatable support and in engagement with the lateral extension of said auxiliary standard, and a catch carried by said rotatable support adapted to engage and retain said lever in an adjusted position.

29. In a device of the character described, the combination with a support, of a revoluble support carried thereby, and vertically-movable, shovel-supporting means carried by said revoluble support.

30. In a device of the character described, the combination with a support, constituting a base, of a revoluble support carried by said base, vertically-movable, shovel-supporting means carried by said revoluble support, and means for adjusting and securing said shovel-supporting means in an adjusted position.

31. In a device of the character described, the combination with a base, of vertically-movable and revoluble shovel-supporting means carried by said base, lever means for adjusting said shovel-supporting means, and locking means for securing said lever and shovel-supporting means in an adjusted position.

32. In a device of the character described, the combination with a support, of a pivoted member carried by said support, a sleeve carried by said pivoted member, and locking means for preventing sliding movement of said sleeve upon said pivoted member.

33. In a device of the character described, the combination with a support, of a movable block carried by said support, a sleeve carried by said block, and locking-collars carried by said sleeve.

34. In a device of the character described, the combination with a support, of a sleeve, constituting a surrounding member, carried by said support, and locking means for preventing sliding movement of said sleeve upon said support.

35. In a device of the character described, the combination with support, of vertically and rotatably movable shovel-supporting means carried by said support, a sleeve carried by said supporting means, locking means for preventing slidable movement of said sleeve, and lever means for moving and securing said supporting means in an adjusted position.

36. In a device of the character described, the combination with a support, of a vertically movable and rotatable frame carried by said support, a handle carried by said frame, and a shovel or scoop provided with a straight back, secured to said handle.

37. In a device of the character described, the combination with a support, of a movable frame carried by said support, lever means for adjusting said frame, a handle carried by said frame, and a shovel provided with a substantially straight back, secured to said handle.

38. In a device of the character described, the combination with a support, of a shovel or scoop provided with a vertical back, carried by said support.

In testimony whereof I affix my signature in presence of two witnesses.

JOHN AUSTIN.

Witnesses:
  CHAS. McLAUGHLIN,
  CHARLES E. BARNARD.